US012634767B2

(12) United States Patent (10) Patent No.: US 12,634,767 B2
Chen et al. (45) Date of Patent: May 19, 2026

(54) DATA TRANSMISSION METHOD AND APPARATUS

(71) Applicant: HUAWEI TECHNOLOGIES CO., LTD., Shenzhen (CN)

(72) Inventors: Erkai Chen, Shenzhen (CN); Shuri Liao, Shanghai (CN); Youlong Cao, Munich (DE); Shengyue Dou, Shanghai (CN); Xiaoying Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 311 days.

(21) Appl. No.: 18/460,613

(22) Filed: Sep. 4, 2023

(65) Prior Publication Data

US 2023/0413121 A1 Dec. 21, 2023

Related U.S. Application Data

(63) Continuation of application No. PCT/CN2021/080434, filed on Mar. 12, 2021.

(51) Int. Cl.
*H04W 76/20* (2018.01)
*H04W 28/02* (2009.01)
*H04W 28/22* (2009.01)

(52) U.S. Cl.
CPC ....... *H04W 28/22* (2013.01); *H04W 28/0268* (2013.01); *H04W 76/20* (2018.02)

(58) Field of Classification Search
None
See application file for complete search history.

(56) References Cited

U.S. PATENT DOCUMENTS

| | | | |
|---|---|---|---|
| 2011/0053634 A1 | 3/2011 | Rofougaran | |
| 2015/0215953 A1* | 7/2015 | Wang | H04W 72/543 |
| | | | 370/230 |
| 2018/0279331 A1* | 9/2018 | Shaheen | H04W 72/23 |
| 2019/0239112 A1* | 8/2019 | Rao | H04L 1/08 |
| 2021/0022131 A1* | 1/2021 | Liu | H04W 72/23 |
| 2022/0330320 A1* | 10/2022 | Adjakple | H04W 72/54 |
| 2022/0377760 A1* | 11/2022 | Sun | H04W 72/543 |

(Continued)

FOREIGN PATENT DOCUMENTS

| | | | |
|---|---|---|---|
| CN | 102025387 A | 4/2011 | |
| CN | 102984802 A | 3/2013 | |
| CN | 110351684 A | * 10/2019 | H04W 28/04 |

OTHER PUBLICATIONS

3GPP TSG RAN Meeting #88e, RP-201145, Revised SID on XR Evaluations for NR ,Qualcomm,Electronic Meeting, Jun. 29-Jul. 3, 2020, total 6 pages.

(Continued)

*Primary Examiner* — Benjamin Lamont

(57) ABSTRACT

In an uplink transmission method for extended reality (XR) services, user equipment (UE) notifies a base station that a data flow of a current service has an uplink integrity transmission requirement. The base station maps a QoS flow having the uplink integrity transmission requirement to a corresponding radio bearer, and notifies the UE of the corresponding radio bearer through a signaling configuration. The UE then reports, through a MAC CE, a data amount of the service flow having the integrity transmission requirement.

13 Claims, 4 Drawing Sheets

600

Terminal | Radio access network device

610 — First information →

650 — Second configuration information ←

660 — Configure a radio bearer RB and/or a logical channel group LCG of the to-be-transmitted data based on the second configuration information 620 — Second information →

630 — First configuration information ←

640 — Configure a transmission resource and/or a priority of to-be-transmitted data based on the first configuration information

(56)                References Cited

U.S. PATENT DOCUMENTS

2023/0189272 A1*   6/2023   Shah ..................... H04L 5/0044
                                                  370/329
2023/0397241 A1*  12/2023   Rosa ..................... H04W 72/23

OTHER PUBLICATIONS

3GPP TR 26.928 V16.1.0 3rd Generation Partnership Project;Technical Specification Group Services and System Aspects; Extended Reality (XR) in 5G (Release 16) Dec. 2020 total 131 pages.
ETSI TS 138 331 V16.3.1 (Jan. 2021), 5G; NR; Radio Resource Control (RRC); Protocol specification(3GPP TS 38.331 version 16.3.1 Release 16), 916 pages.

* cited by examiner

600

700

DATA TRANSMISSION METHOD AND APPARATUS

CROSS-REFERENCE TO RELATED APPLICATIONS

This application is a continuation of International Application PCT/CN2021/080434, filed on Mar. 12, 2021, the disclosure of which is hereby incorporated by reference in its entirety.

TECHNICAL FIELD

This application relates to the field of communication technologies, and in particular, to a data transmission method and an apparatus.

BACKGROUND

In recent years, with continuous progress and improvement of an extended reality (XR) technology, related industries have been vigorously developed. Nowadays, a virtual reality technology has entered various fields, for example, education, entertainment, military affairs, medical care, environmental protection, transportation, and public health, closely related to production and life of people. Compared with a conventional video service, virtual reality (VR) has advantages such as multi-view and strong interaction, provides brand-new visual experience for a user, and has great application value and business potential. XR is a general term for virtual reality VR, augmented reality (AR), and mixed reality (MR), and is widely used in many fields such as entertainment, gaming, medical care, advertising, industry, online education, and engineering.

In addition, as a new service, a tactile internet can implement remote touch applications and remote control of machines, implement remote sensing in terms of vision, hearing, touch, and smell, have great development space in related fields such as industrial automation, medical care, and distance education, provide brand-new tactile interaction experience for the user, and have a great application value and business potential.

As an increasingly high requirement is put forward on quality of video transmission, with further development of the extended reality and the tactile internet, guarantee of quality of experience (QoE) and quality of service (QoS) of the user has become a key issue in current research.

SUMMARY

Embodiments of this application provide a communication method and an apparatus.

According to a first aspect, an embodiment of this application provides a communication method. The method may be performed by a radio access network device, or may be performed by a component (for example, a processor, a chip, or a chip system) of the radio access network device. The method includes: receiving first information from a terminal, where the first information indicates an integrity transmission requirement of to-be-transmitted data of the terminal; receiving second information from the terminal, where the second information indicates a data amount of the to-be-transmitted data; and outputting first configuration information based on the integrity transmission requirement and the data amount of the to-be-transmitted data, where the first configuration information is for configuring a transmission resource and/or a priority of the to-be-transmitted data. It may be understood that a specific name of the integrity transmission requirement is not limited in this embodiment of this application. The integrity transmission requirement is merely a possible name. Any other requirement name that can reflect the foregoing functions should be understood as the integrity transmission requirement in the solutions of this application. It may be understood that when the foregoing integrity transmission requirement exists, data information included in a service may be considered as a whole and transmitted on a radio access network device side, to support integrity transmission of the data on the radio access network device, and improve user experience of the XR service.

According to the method, the transmission resource and/or the priority of the to-be-transmitted data may be configured based on the first configuration information, so that a loss of a small quantity of data packets in a network transmission process of a data packet having an integrity requirement can be effectively reduced, network uplink transmission efficiency is improved, and user experience of a related service is enhanced.

With reference to the first aspect, in some implementations of the first aspect, the first information further indicates one or more of a delay budget of a data packet of to-be-transmitted data, data packet arrival time of the to-be-transmitted data, or a remaining delay budget of the to-be-transmitted data. For example, the first information may further indicate the delay budget of the data packet of the to-be-transmitted data, the data packet arrival time of the to-be-transmitted data, or the remaining delay budget of the to-be-transmitted data. For another example, the first information may further indicate the delay budget of the data packet of the to-be-transmitted data and the data packet arrival time of the to-be-transmitted data. Alternatively, the first information may further indicate the delay budget of the data packet of the to-be-transmitted data and the remaining delay budget of the to-be-transmitted data. Alternatively, the first information may further indicate the data packet arrival time of the to-be-transmitted data and the remaining delay budget of the to-be-transmitted data. For another example, the first information may further indicate the delay budget of the data packet of the to-be-transmitted data, the data packet arrival time of the to-be-transmitted data, and the remaining delay budget of the to-be-transmitted data. In this implementation, the transmission resource and/or the priority of the to-be-transmitted data may be configured based on the first configuration information, so that the loss of the few data packets in the network transmission process of data packets having the integrity requirement can be effectively reduced, the network uplink transmission efficiency is improved, and user experience of the related service is enhanced.

With reference to the first aspect, in some implementations of the first aspect, the outputting first configuration information based on the integrity transmission requirement and the data amount of the to-be-transmitted data includes: outputting the first configuration information based on the integrity transmission requirement and the data amount of the to-be-transmitted data and one or more of the delay budget of the data packet of the to-be-transmitted data, the data packet arrival time of the to-be-transmitted data, or the remaining delay budget of the to-be-transmitted data. In this implementation, the transmission resource and/or the priority of the to-be-transmitted data may be configured based on the first configuration information, so that the loss of the few data packets in the network transmission process of data packets having the integrity requirement can be effectively reduced, the network uplink transmission efficiency is improved, and user experience of the related service is enhanced.

With reference to the first aspect, in some implementations of the first aspect, the receiving first information from a terminal includes: receiving a radio resource control RRC message from the terminal, where the RRC message includes the first information. In this implementation, a process of interaction between the terminal and the radio access network device about the first information can be implemented.

With reference to the first aspect, in some implementations of the first aspect, the first information further includes a quality of service flow identifier QFI. In this implementation, the process of interaction between the terminal and the radio access network device about the first information can be implemented.

With reference to the first aspect, in some implementations of the first aspect, the method further includes: outputting second configuration information based on the first information, where the second configuration information is for configuring a radio bearer RB and/or a logical channel group LCG of the to-be-transmitted data. In this implementation, the transmission resource and/or the priority of the to-be-transmitted data may be configured based on the second configuration information, so that the loss of the few data packets in the network transmission process of data packets having the integrity requirement can be effectively reduced, the network uplink transmission efficiency is improved, and user experience of the related service is enhanced.

With reference to the first aspect, in some implementations of the first aspect, the second configuration information is for mapping a quality of service flow QoS flow of the to-be-transmitted data to a corresponding RB. In this implementation, the transmission resource and/or the priority of the to-be-transmitted data may be configured based on the second configuration information, so that the loss of the few data packets in the network transmission process of data packets having the integrity requirement can be effectively reduced, the network uplink transmission efficiency is improved, and user experience of the related service is enhanced.

With reference to the first aspect, in some implementations of the first aspect, the second configuration information is for classifying a logical channel of the to-be-transmitted data into a corresponding LCG. In this manner, the transmission resource and/or the priority of the to-be-transmitted data may be configured based on the second configuration information, so that the loss of the few data packets in the network transmission process of data packets having the integrity requirement can be effectively reduced, the network uplink transmission efficiency is improved, and user experience of the related service is enhanced.

With reference to the first aspect, in some implementations of the first aspect, the receiving first information from a terminal includes:

receiving a media access control control element (MAC CE) from the terminal, where the MAC CE includes the first information. In this implementation, the process of interaction between the terminal and the radio access network device about the first information can be implemented.

With reference to the first aspect, in some implementations of the first aspect, the receiving second information from the terminal includes:

receiving a MAC CE from the terminal, where the MAC CE includes the second information. In this implementation, a process of interaction between the terminal and the radio access network device about the second information can be implemented.

With reference to the first aspect, in some implementations of the first aspect, the first configuration information is for configuring a priority of the logical channel corresponding to the to-be-transmitted data. In this implementation, the transmission resource and/or the priority of the to-be-transmitted data may be configured based on the first configuration information, so that the loss of the few data packets in the network transmission process of data packets having the integrity requirement can be effectively reduced, the network uplink transmission efficiency is improved, and user experience of the related service is enhanced.

According to a second aspect, an embodiment of this application provides a communication method. The method may be performed by a terminal, or may be performed by a component (for example, a processor, a chip, or a chip system) of the terminal. The method includes: sending first information to a radio access network device, where the first information indicates an integrity transmission requirement of to-be-transmitted data of a terminal; sending second information to the radio access network device, where the second information indicates a data amount of the to-be-transmitted data; receiving first configuration information from the radio access network device; and configuring a transmission resource and/or a priority of the to-be-transmitted data based on the first configuration information. According to the method, the transmission resource and/or the priority of the to-be-transmitted data may be configured based on the first configuration information, so that a loss of a small quantity of data packets in a network transmission process of a data packet having an integrity requirement can be effectively reduced, network uplink transmission efficiency is improved, and user experience of a related service is enhanced.

With reference to the second aspect, in some implementations of the second aspect, the first information further indicates one or more of a delay budget of a data packet of the to-be-transmitted data, data packet arrival time of the to-be-transmitted data, or a remaining delay budget of the to-be-transmitted data. For example, the first information may further indicate the delay budget of the data packet of the to-be-transmitted data, the data packet arrival time of the to-be-transmitted data, or the remaining delay budget of the to-be-transmitted data. For another example, the first information may further indicate the delay budget of the data packet of the to-be-transmitted data and the data packet arrival time of the to-be-transmitted data. Alternatively, the first information may further indicate the delay budget of the data packet of the to-be-transmitted data and the remaining delay budget of the to-be-transmitted data. Alternatively, the first information may further indicate the data packet arrival time of the to-be-transmitted data and the remaining delay budget of the to-be-transmitted data. For another example, the first information may further indicate the delay budget of the data packet of the to-be-transmitted data, the data packet arrival time of the to-be-transmitted data, and the remaining delay budget of the to-be-transmitted data. In this implementation, the transmission resource and/or the priority of the to-be-transmitted data may be configured based on the first configuration information, so that the loss of the few data packets in the network transmission process of data packets having the integrity requirement can be effectively reduced, the network uplink transmission efficiency is improved, and user experience of the related service is enhanced.

With reference to the second aspect, in some implementations of the second aspect, the sending first information to a radio access network device includes: sending a radio resource control RRC message to the radio access network device, where the RRC message includes the first information. In this implementation, a process of interaction between the terminal and the radio access network device about the first information can be implemented.

With reference to the second aspect, in some implementations of the second aspect, the first information further includes a quality of service flow identifier QFI. In this implementation, the process of interaction between the terminal and the radio access network device about the first information can be implemented.

With reference to the second aspect, in some implementations of the second aspect, the method further includes: receiving a second configuration message from the radio access network device; and configuring a radio bearer RB and/or a logical channel group LCG of the to-be-transmitted data based on the second configuration message. In this implementation, the transmission resource and/or the priority of the to-be-transmitted data may be configured based on the second configuration information, so that the loss of the few data packets in the network transmission process of data packets having the integrity requirement can be effectively reduced, the network uplink transmission efficiency is improved, and user experience of the related service is enhanced.

With reference to the second aspect, in some implementations of the second aspect, the configuring a radio bearer RB of the to-be-transmitted data based on the second configuration message includes: mapping a quality of service flow QoS flow of the to-be-transmitted data to a corresponding RB based on the second configuration message. In this implementation, the transmission resource and/or the priority of the to-be-transmitted data may be configured based on the second configuration information, so that the loss of the few data packets in the network transmission process of data packets having the integrity requirement can be effectively reduced, the network uplink transmission efficiency is improved, and user experience of the related service is enhanced.

With reference to the second aspect, in some implementations of the second aspect, the configuring an LCG of the to-be-transmitted data based on the second configuration message includes: classifying a logical channel of the to-be-transmitted data into a corresponding service LCG based on the second configuration message. In this manner, the transmission resource and/or the priority of the to-be-transmitted data may be configured based on the second configuration information, so that the loss of the few data packets in the network transmission process of data packets having the integrity requirement can be effectively reduced, the network uplink transmission efficiency is improved, and user experience of the related service is enhanced.

With reference to the second aspect, in some implementations of the second aspect, the sending first information to a radio access network device includes: sending a MAC CE to the radio access network device, where the MAC CE includes the first information. In this implementation, the process of interaction between the terminal and the radio access network device about the first information can be implemented.

With reference to the second aspect, in some implementations of the second aspect, the sending second information to the radio access network device includes: sending a MAC CE to the radio access network device, where the MAC CE includes the second information. In this implementation, a process of interaction between the terminal and the radio access network device about the second information can be implemented.

With reference to the second aspect, in some implementations of the second aspect, the configuring a priority of the to-be-transmitted data based on the first configuration information includes: configuring, based on the first configuration information, a priority of the logical channel corresponding to the to-be-transmitted data. In this implementation, the transmission resource and/or the priority of the to-be-transmitted data may be configured based on the first configuration information, so that the loss of the few data packets in the network transmission process of data packets having the integrity requirement can be effectively reduced, the network uplink transmission efficiency is improved, and user experience of the related service is enhanced. According to a third aspect, an embodiment of this application provides an apparatus.

The apparatus may implement the method in any one of the first aspect or the possible implementations of the first aspect. The apparatus includes a corresponding unit or component configured to perform the foregoing method. The unit included in the apparatus may be implemented in a software and/or hardware manner. The apparatus may be, for example, a terminal or a network device, or may be a chip, a chip system, a processor, or the like that supports the terminal or the network device in implementing the foregoing method.

According to a fourth aspect, an embodiment of this application provides an apparatus. The apparatus may implement the method in any one of the second aspect or the possible implementations of the second aspect. The apparatus includes a corresponding unit or component configured to perform the foregoing method. The unit included in the apparatus may be implemented in a software and/or hardware manner. The apparatus may be, for example, a terminal or a network device, or may be a chip, a chip system, a processor, or the like that supports the terminal or the network device in implementing the foregoing method.

According to a fifth aspect, an embodiment of this application provides an apparatus. The apparatus includes: a processor, where the processor is coupled to a memory, the memory is configured to store a program or instructions, and when the program or the instructions are executed by the processor, the apparatus is enabled to implement the method in any one of the first aspect or the possible implementations of the first aspect.

According to a sixth aspect, an embodiment of this application provides an apparatus. The apparatus includes: a processor, where the processor is coupled to a memory, the memory is configured to store a program or instructions, and when the program or the instructions are executed by the processor, the apparatus is enabled to implement the method in any one of the second aspect or the possible implementations of the second aspect.

According to a seventh aspect, an embodiment of this application provides a computer-readable storage medium. The computer-readable storage medium stores a computer program or instructions, and when the computer program or the instructions are executed, a computer is enabled to perform the method in any one of the first aspect or the possible implementations of the first aspect.

According to an eighth aspect, an embodiment of this application provides a computer-readable storage medium. The computer-readable storage medium stores a computer program or instructions, and when the computer program or the instructions are executed, a computer is enabled to perform the method in any one of the second aspect or the possible implementations of the second aspect.

According to a ninth aspect, an embodiment of this application provides a computer program product, including computer program code. When the computer program code is run on a computer, the computer is enabled to perform the method in any one of the first aspect or the possible implementations of the first aspect.

According to a tenth aspect, an embodiment of this application provides a computer program product, including computer program code. When the computer program code is run on a computer, the computer is enabled to perform the method in any one of the second aspect or the possible implementations of the second aspect.

According to an eleventh aspect, an embodiment of this application provides a chip. The chip includes: a processor, where the processor is coupled to a memory, the memory is configured to store a program or instructions, and when the program or the instructions are executed by the processor, the chip is enabled to implement the method in any one of the first aspect or the possible implementations of the first aspect.

According to a twelfth aspect, an embodiment of this application provides a chip. The chip includes: a processor, where the processor is coupled to a memory, the memory is configured to store a program or instructions, and when the program or the instructions are executed by the processor, the chip is enabled to implement the method in any one of the second aspect or the possible implementations of the second aspect.

According to a thirteenth aspect, an embodiment of this application provides a communication system, including: the apparatus according to the third aspect and the apparatus according to the fourth aspect.

According to a fourteenth aspect, an embodiment of this application provides a communication system, including: the apparatus according to the fifth aspect and the apparatus according to the sixth aspect.

DESCRIPTION OF EMBODIMENTS

Figure 1:
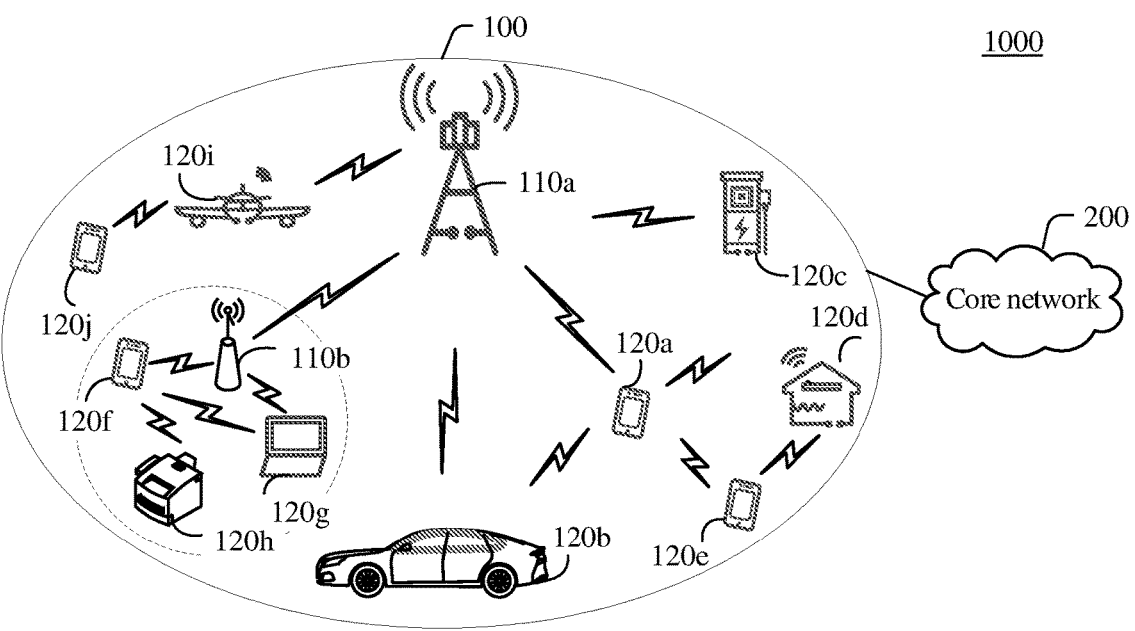
FIG. 1 is a schematic diagram of a communication system to which embodiments are applied according to this application.

A method and an apparatus provided in embodiments of this application may be applied to a communication system. FIG. 1 is a schematic diagram of an architecture of a communication system 1000 to which embodiments of this application are applied. As shown in FIG. 1, the communication system includes a radio access network 100 and a core network 200. The radio access network 100 may include at least one radio access network device (for example, 110*a* and 110*b* in FIG. 1), and may further include at least one terminal (for example, 120*a* to 120*j* in FIG. 1). The terminal is connected to the radio access network device in a wireless manner, and the radio access network device is connected to the core network in a wireless or wired manner. A core network device and the radio access network device may be different independent physical devices. Alternatively, a function of the core network device and a logical function of the radio access network device may be integrated into a same physical device. Alternatively, a part of functions of the core network device and a part of functions of the radio access network device may be integrated into a physical device. All or a part of functions of the radio access network device may alternatively be implemented through a software function running on hardware, or implemented through a virtualized function instantiated on a platform (for example, a cloud platform). Terminals may be connected to each other and radio access network devices may be connected to each other in a wired or wireless manner. FIG. 1 is only a schematic diagram. The communication system may further include another network device, for example, may further include a wireless relay device and a wireless backhaul device, which are not shown in FIG. 1.

The radio access network device may be a base station, an evolved NodeB (eNodeB), a transmission reception point (TRP), a next generation NodeB (gNB) in a 5th generation (5G) mobile communication system, a next generation base station in a 6th generation (6G) mobile communication system, a base station in a future mobile communication system, an access node in a Wi-Fi system, or the like; or may be a module or a unit that implements a part of functions of a base station, for example, may be a central unit (CU), or may be a distributed unit (DU). The radio access network device may be a macro base station (for example, 110*a* in FIG. 1), or may be a micro base station or an indoor station (for example, 110*b* in FIG. 1), or may be a relay node, a donor node, or the like. A specific technology and a specific device form used by the radio access network device are not limited in embodiments of this application. For ease of description, the following uses an example in which a base station is used as a radio access network device for description.

In this application, the terminal may be a terminal in an internet of things (IoT) system. IoT is an important component in development of future information technologies. A main technical feature of the IoT is to connect an object to a network by using a communication technology, to implement an intelligent network of human-machine interconnection and thing-thing interconnection. The terminal in this application may be a terminal in machine type communication (MTC). The terminal in this application may be a vehicle-mounted module, a vehicle-mounted component, an onboard component, a vehicle-mounted chip, or a vehicle-mounted unit that is built in a vehicle as one or more components or units. The vehicle uses the vehicle-mounted module, the vehicle-mounted component, the onboard component, the vehicle-mounted chip, or the vehicle-mounted unit that is built in the vehicle, to implement the method in this application. Therefore, embodiments of this application may be applied to an internet of vehicles, for example, vehicle-to-everything (V2X), long term evolution-vehicle (LTE-V), and vehicle-to-vehicle (V2V).

In this application, the terminal may also be sometimes referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a wireless communication device, a machine terminal, a UE agent, a UE apparatus, or the like.

Alternatively, the terminal in this application may be a virtual reality (VR) terminal device, an augmented reality (AR) terminal device, or a mixed reality (MR) terminal device. The VR terminal, the AR terminal, and the MR terminal may all be referred to as extended reality (XR) terminal devices. For example, the XR terminal may be a head-mounted device (for example, a helmet or glasses), or may be an all-in-one device, or may be a television, a display, a car, a vehicle-mounted device, a tablet, a smart screen, a holographic projector, a video player, a remote control robot, or a tactile internet terminal. The XR terminal can present XR data to a user, and the user can experience diversified XR services by wearing or using the XR terminal. The XR terminal may access a network in a wireless or wired manner, for example, access a network through a wireless fidelity (Wi-Fi) or 5G system. The base station and the terminal may be at a fixed location, or may be mobile. The base station and the terminal device each may be deployed on land, including an indoor or outdoor device, a handheld device, or a vehicle-mounted device, may be deployed on a water surface, or may be deployed on an airplane, in a balloon, or on an artificial satellite in air. Application scenarios of the base station and the terminal are not limited in embodiments of this application.

Roles of the base station and the terminal may be relative. For example, a helicopter or an uncrewed aerial vehicle 120*i* in FIG. 1 may be configured as a mobile base stations. For the terminal 120*j* that accesses the radio access network 100 through 120*i*, the terminal 120*i* is a base station. However, for the base station 110*a*, 120*i* is a terminal, that is, communication between 110*a* and 120*i* is performed according to a wireless air interface protocol. Certainly, communication between 110*a* and 120*i* may alternatively be performed according to an interface protocol between base stations. In this case, relative to 110*a*, 120*i* is also a base station. Therefore, both the base station and the terminal may be collectively referred to as communication apparatuses, 110*a* and 110*b* in FIG. 1 may be referred to as communication apparatuses having a base station function, and 120*a* to 120*j* in FIG. 1 may be referred to as communication apparatuses having a terminal function.

Communication between a base station and a terminal, between base stations, and between terminals may be performed through a licensed spectrum, or may be performed through an unlicensed spectrum, or may be performed through both a licensed spectrum and an unlicensed spectrum. Communication may be performed through a spectrum below 6 gigahertz (GHz), or may be performed through a spectrum above 6 GHz, or may be performed through both a spectrum below 6 GHz and a spectrum above 6 GHz. A spectrum resource used for wireless communication is not limited in embodiments of this application.

In embodiments of this application, a function of the base station may alternatively be performed by a module (for example, a chip) in the base station, or may be performed by a control subsystem that includes a function of the base station. The control subsystem that includes a function of the base station herein may be a control center in an application scenario, such as a smart grid, industrial control, intelligent transportation, and a smart city, of the foregoing terminal. A function of the terminal may alternatively be performed by a module (for example, a chip or a modem) in the terminal, or may be performed by an apparatus that includes a function of the terminal.

In this application, the base station sends a downlink signal or downlink information to the terminal, where the downlink information is carried on a downlink channel. The terminal sends an uplink signal or uplink information to the base station, where the uplink information is carried on an uplink channel. The terminal sends a sidelink signal or sidelink information to the terminal, where the sidelink information is carried on a sidelink channel.

Figure 2:
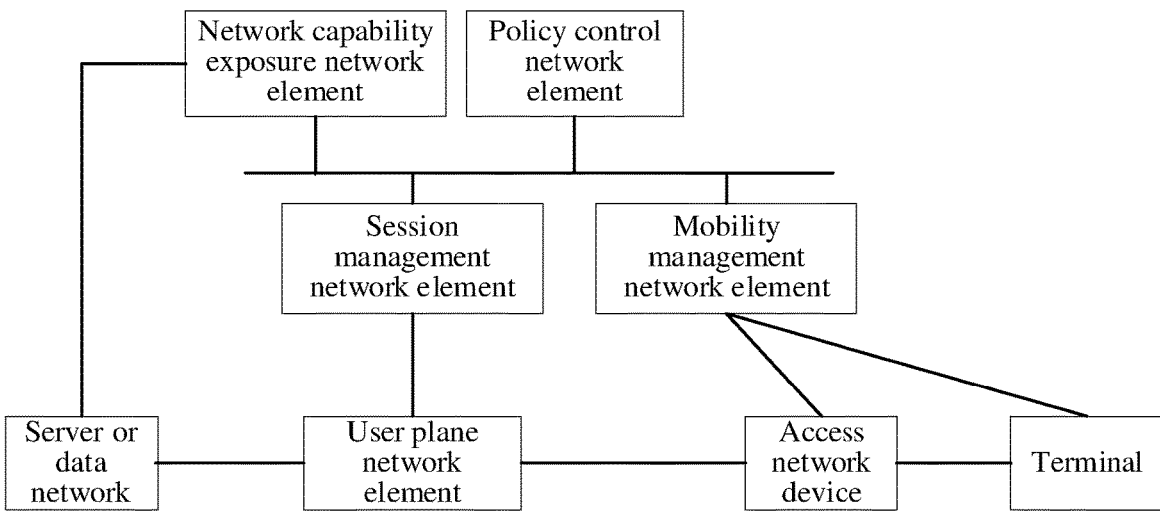
FIG. 2 is a schematic diagram of an architecture of a communication system to which embodiments are applied according to this application.

The method and the apparatus provided in embodiments of this application may be used in architectures of a plurality of communication systems. FIG. 2 is a schematic diagram of an architecture of a communication system. In the architecture of the communication system, a terminal accesses a core network through an access network (RAN) device. The terminal may establish a connection to a data network (DN) or a server in the data network through an access network and the core network. The data network may include, for example, an operator service, an internet, or a third-party service. In a 4th generation (4G) mobile communication system, the connection may be a packet data network connection (PDN connection) or a bearer. In a 5G communication system, the connection may be a protocol data unit session (PDU session). In a future communication system such as a 6G communication system, the connection may be a PDU session, a PDN connection, or another similar concept. This is not limited in embodiments of this application. In embodiments of this application, a connection established between the terminal and the data network or the server may also be referred to as a session.

The core network includes a mobility management network element, a session management network element, and a user plane network element. Optionally, the core network further includes a network capability exposure network element and/or a policy control network element.

The mobility management network element is mainly used for mobility management in a mobile network, for example, user location update, registration of a user with a network, and user switching. In the 4G communication system, the mobility management network element may be a mobility management entity (MME). In the 5G communication system, the mobility management network element may be an access and mobility management function (AMF).

The session management network element is mainly used for session management in a mobile network, for example, session establishment, modification, and release. A specific function is, for example, allocating an internet protocol (IP) address to a user, or selecting a user plane network element that provides a packet forwarding function. In the 4G communication system, the session management network element may be a serving gateway control plane (SGW-C), a packet data network gateway control plane (PGW-C), or a network element in which an SGW-C and a PGW-C are co-deployed. In the 5G communication system, the session management network element may be a session management function (SMF).

The user plane network element is mainly configured to forward a user data packet according to a routing rule of the session management network element. In the 4G communication system, the user plane network element may be a serving gateway user plane (SGW-U), a packet data network gateway user plane (PGW-U), or a network element in which an SGW-U and a PGW-U are co-deployed. In the 5G communication system, the user plane network element may be a user plane function (UPF) network element.

The policy control network element includes a user subscription data management function, a policy control function, a charging policy control function, quality of service (QoS) control, and the like. In the 4G communication system, the policy control network element may be a policy control and charging function (PCRF). In the 5G communication system, the policy control network element may be a policy control function (PCF).

The network capability exposure network element is mainly configured to: expose a capability of a communication system to a third-party, an application service function, and the like, and transfer information between the third-party, the application server, and the communication system. In the 4G communication system, the network capability exposure network element may be a service capability exposure function (SCEF). In the 5G communication system, the network capability exposure network element may be a network exposure function (NEF).

In a future communication system such as a 6G communication system, the network elements or devices may still use names of the network elements or devices in the 4G or 5G communication system, or may have other names. Functions of the network elements or devices may be implemented by one independent network element, or may be jointly implemented by several network elements. This is not limited in embodiments of this application.

During actual deployment, network elements in a core network may be deployed on a same physical device or different physical devices. For example, in a possible deployment, an AMF and an SMF may be deployed on a same physical device. For another example, a network element in a 5G core network and a network element in a 4G core network may be deployed on a same physical device.

During actual deployment, network elements in the core network may be co-deployed. For example, the mobility management network element and the session management network element may be co-deployed. For another example, the session management network element and the user plane network element may be co-deployed. When two or more network elements are co-deployed, interaction between the two or more network elements provided in this application becomes an internal operation of the co-deployed network element, or may be omitted.

Compared with a core network in the 4G communication system, a core network in the communication system uses an architecture in which a control plane is separated from a user plane and a service-based architecture. It may be understood that the solutions in this application are applicable to the 5G communication system, and are also applicable to an evolved 4G communication system, a future 6G communication system, or the like. A network to which the solutions in this application are applicable may use the architecture in which the control plane is separated from the user plane, or may use an architecture in which a control plane and a user plane are integrated. A network to which the solutions in this application are applicable may use the service-based architecture, or may use a non-service-based architecture.

It may be understood that, with evolution of a network, names of the network elements may be changed, and functions of the network elements may also be combined, separated, or even changed. However, these changes do not mean that they depart from the application scope of the solutions of this application.

In a wireless communication network, an XR technology has advantages such as multi-view and strong interaction, can provide brand-new experience for a user, and has great application value and business potential. XR includes technologies such as VR, AR, and MR, and can be widely used in many fields such as entertainment, gaming, medical care, advertising, industry, online education, and engineering.

A VR technology mainly refers to rendering of visual and audio scenarios to simulate sensory stimulation of vision and audio in a real world to a user as much as possible. In the VR technology, a user may wear an XR terminal (for example, a head-mounted device) to simulate a visual sense and/or an auditory sense to the user. The VR technology may further perform action tracking on the user, to update simulated visual and/or auditory content in a timely manner. The AR technology is mainly to provide additional visual and/or auditory information or manually generated content in a real environment perceived by the user. The user may directly (where for example, sensing, processing, and rendering is not performed) or indirectly (where for example, transfer is performed through a sensor or the like) perceive the real environment, and further enhancement processing is performed. The MR technology is to insert some virtual elements into a physical scenario, to provide immersive experience for the user by adding these elements as a part of a real scenario. A network device may process and transmit data (which may be referred to as XR data) generated by an XR service. For example, a network device in a cloud may render and encode (for example, source encode) XR source data, and transmit XR data to an XR terminal via a network device in a core network and/or an access network. The XR terminal provides diversified XR experience (for example, immersive experience, visual experience, interaction experience, or device experience) for the user by processing the XR data. The XR experience may be evaluated from a plurality of different dimensions, for example, including one or more of the following dimensions: image definition, image smoothness, image distortion, image stereoscopy, image black borders, image smearing, sound quality, sound effect, angle of view, freezing, artifacts, dizziness, audio and video synchronization, interaction freedom, interaction operation response speed, interaction operation precision, interaction content loading speed, terminal wearing comfort, terminal wearing fatigue, terminal battery life, terminal portability, terminal visual impairment friendliness, or the like.

For transmission of a video service such as XR, a picture frame or a picture frame slice or segment may be sent to a terminal in a form of a data packet. For example, the picture frame or the picture frame slice or segment is encapsulated into internet protocol (IP) packets at a network transport layer and transmitted to a fixed network/core network, and then the IP data packets are transmitted to the terminal through a wireless air interface. It may be understood that the picture frame in this application may also be referred to as a video frame or a data frame. A video frame segment or a video frame slice means that a video frame may be encoded based on area division of a video picture during encoding, and a division area is referred to as the video frame segment or the video frame slice.

A feature of video frame, video frame slice, or video frame segment transmission is that a plurality of data packets included in the video frame, the video frame slice, or the video frame segment may be considered as a whole. When a data packet is incorrectly transmitted, the entire video frame, video frame slice, or video frame segment is also incorrect.

In an uplink transmission process, if UE has no uplink data to be transmitted, a base station does not need to allocate an uplink resource to the UE. Otherwise, a waste of resources is caused. Therefore, the UE first notifies the base station whether the UE has uplink data to be transmitted, and then the base station can determine whether to allocate an uplink resource to the UE. For example, the UE notifies, through an uplink scheduling request (SR), the base station whether an uplink resource is required for uplink data transmission, but does not notify the base station of a specific amount of uplink data to be sent (which is reported through a buffer status report (BSR)). After receiving the SR, a quantity of uplink resources allocated by the base station to the UE usually depends on implementation of the base station. For example, at least sufficient resources for the UE to send the BSR may be allocated.

When the UE requests the uplink resource from the base station through the SR, the UE only indicates whether the UE has the uplink data to be sent, but does not indicate the specific amount of uplink data to be sent. The UE needs to notify, through the BSR, the base station of the specific amount of data to be sent, so that the base station determines a quantity of uplink resources to be allocated to the UE. The UE may establish different radio bearers (RBs) based on different services, and each radio bearer corresponds to one logical channel. If one BSR is reported for each logical channel, a large quantity of signaling overheads are caused. To avoid this case, for example, a concept of a logical channel group (LCG) may be introduced, and each logical channel is placed in one LCG. The UE reports a BSR based on the LCG instead of one BSR for each logical channel.

In an existing SR and BSR mechanism, reporting can be performed only in a unit of the LCG. For XR and video services, a data flow of one service corresponds to one logical channel, and in one data flow, one video frame is split into a plurality of data packets, and these data packets may not reach a buffer at the same time. As a result, the base station cannot perceive a size of a data amount of one video frame, and therefore cannot perform optimized scheduling for a plurality of data packets of the same video frame. Incorrect transmission of individual data packets leads to an error in the entire picture frame, causing ineffective transmission of correctly transmitted data packets and reducing network transmission efficiency. Therefore, for data having an internal association relationship in a same service (for example, a plurality of data packets corresponding to a picture frame in a video transmission/extended reality service), how to ensure that the data having the internal association relationship may be efficiently transmitted in an uplink transmission process to improve user experience of an XR service becomes an urgent problem to be resolved.

Embodiments of this application provide an uplink transmission method for an XR service for XR data transmission, to effectively avoid a loss of a small quantity of data packets in a network transmission process of a data packet having an integrity requirement, effectively improve network uplink transmission efficiency, and ensure user experience of a related service.

Integrity transmission of data in this application may be understood as that two or more video frames, video frame segments, or video frame slices are considered as a whole for transmission. An integrity object may have a plurality of different understandings.

For example, the integrity object may be content, that is, content integrity. Content in a plurality of different dimensions has association relationship. Therefore, integrity transmission is performed on a plurality of data units cor-responding to the content in the plurality of dimensions. For example, there is an association relationship between a plurality of data units corresponding to content of a picture frame, there is an association relationship between a base layer data unit and an enhancement layer data unit corresponding to content of a picture frame, or there is an association relationship between a picture frame data unit and an audio data unit. For another example, there is an association relationship between a plurality of data units corresponding to content of a picture frame segment, or there is an association relationship between a base layer data unit and an enhancement layer data unit corresponding to content of a picture frame segment. For another example, there is an association relationship between a plurality of data units corresponding to content of a picture frame slice, or there is an association relationship between a base layer data unit and an enhancement layer data unit corresponding to content of a picture frame slice.

For another example, the integrity object may alternatively be a task, an event, an object, or a class, that is, task integrity, event integrity, object integrity, or class integrity. A plurality of data units in a same task, a same event, a same object, or a same class have an association relationship, and therefore integrity transmission is performed on the plurality of data units in the same task, the same event, the same object, or the same class. For example, in a tactile Internet, there is an association relationship between a plurality of data units corresponding to information such as a video, audio, an action, and a tactile sense. For example, a data packet corresponding to the video and a data packet corresponding to the audio both belong to data of the tactile Internet and have an association relationship.

It may be understood that the data unit in this application may be a data packet, a video frame, a video frame segment, or a video frame slice.

It may be understood that the integrity transmission and the integrity object in this application may alternatively have other descriptions. For example, the integrity transmission may alternatively be described as task-driven transmission, event-based transmission, object-oriented transmission, or the like, which falls within the scope of this application.

Embodiments provided in this application are applicable to a plurality of different scenarios. For example, FIG. 3 to FIG. 5 are schematic diagrams of several scenarios to which embodiments of this application are applicable.

Figure 3:
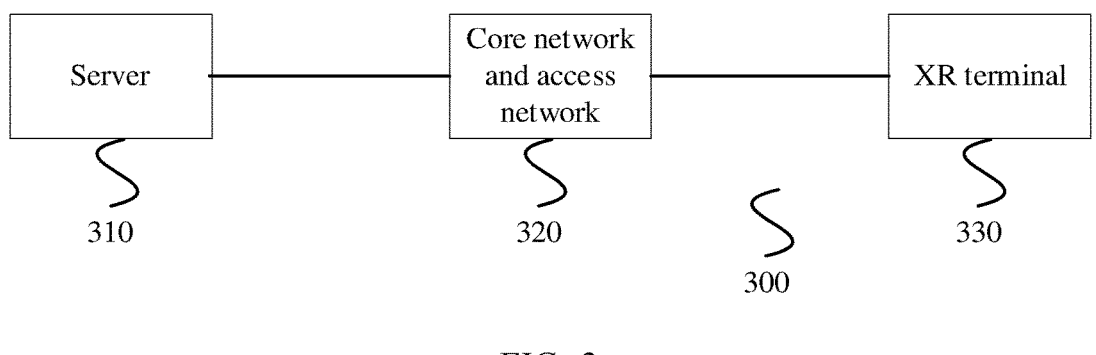
FIG. 3 to FIG. 5 are schematic diagrams of several scenarios to which embodiments of this application are applicable.

FIG. 3 is a schematic diagram of a scenario to which embodiments of this application are applicable. FIG. 3 shows a system 300, including a server 310, a core network and an access network 320 (which may be briefly referred to as a transport network 320, such as an LTE network, a 5G network, or a 6G network), and an XR terminal 330. The server 310 may be configured to encode, decode, and render XR source data, the transport network 320 may be configured to transmit XR data, and the XR terminal 330 provides diversified XR experience for a user by processing the XR data. It may be understood that another apparatus may be further included between the transport network 320 and the XR terminal 330. For example, another terminal (such as a mobile phone, a laptop computer, or a vehicle) and/or a network device (such as a relay device, a Wi-Fi router, or a Wi-Fi access point) may be further included. The XR terminal 330 obtains the XR data from the transport network 320 through the another terminal and/or the network device.

Figure 4:
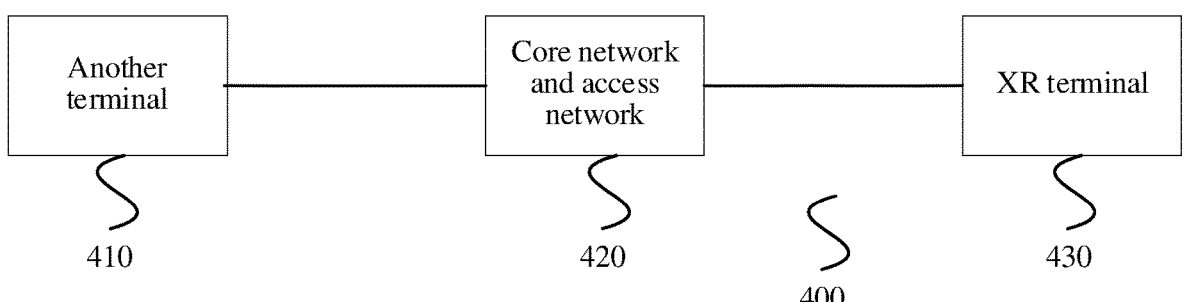

FIG. 4 is a schematic diagram of another scenario to which embodiments of this application are applicable. FIG. 4 shows a system 400, including an XR terminal 430, a core network and an access network 420 (which may be briefly referred to as a transport network 420, such as an LTE network, a 5G network, or a 6G network), and another terminal 410. The another terminal 410 is a terminal other than the XR terminal 430. The another terminal 410 may be an XR terminal, or may be a common terminal (which may also be referred to as a non-XR terminal). The another terminal 410 may transmit data to the XR terminal 430 through the transport network 420. For example, in a tactile internet, the XR terminal 430 may be a remote control robot or a remote operator in a controlled domain, the another terminal 410 may be a tactile user and/or a manual system interface in a primary domain, and the another terminal 410 in the primary domain transmits data to the XR terminal 430 in the controlled domain through the transport network 420, to implement remote control on the XR terminal 430.

Figure 5:
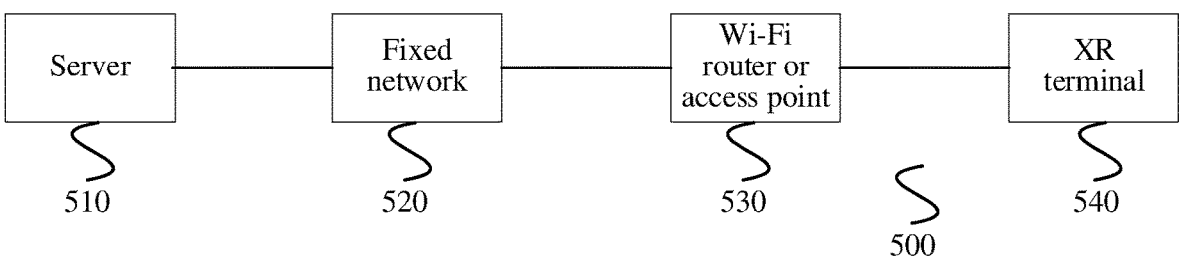

FIG. 5 is a schematic diagram of another scenario to which embodiments of this application are applicable. FIG. 5 shows a system 500, including a server 510, a fixed network 520, a Wi-Fi router or a Wi-Fi access point 530 (which may be briefly referred to as a Wi-Fi apparatus 530), and an XR terminal 540. The server 510 may be configured to: encode, decode, and render XR source data, and transmit XR data to the XR terminal 540 through the fixed network 520 and the Wi-Fi apparatus 530.

The following describes the technical solutions of this application in detail by using specific embodiments with reference to the accompanying drawings. The following embodiments and implementations may be combined with each other, and same or similar concepts or processes may not be described again in some embodiments. It should be understood that a function explained in this application may be implemented by using an independent hardware circuit, software running in combination with a processor/microprocessor or a general-purpose computer, an application-specific integrated circuit, and/or one or more digital signal processors. When described as a method, this application may alternatively be implemented in a computer processor and a memory coupled to the processor.

Figure 6:
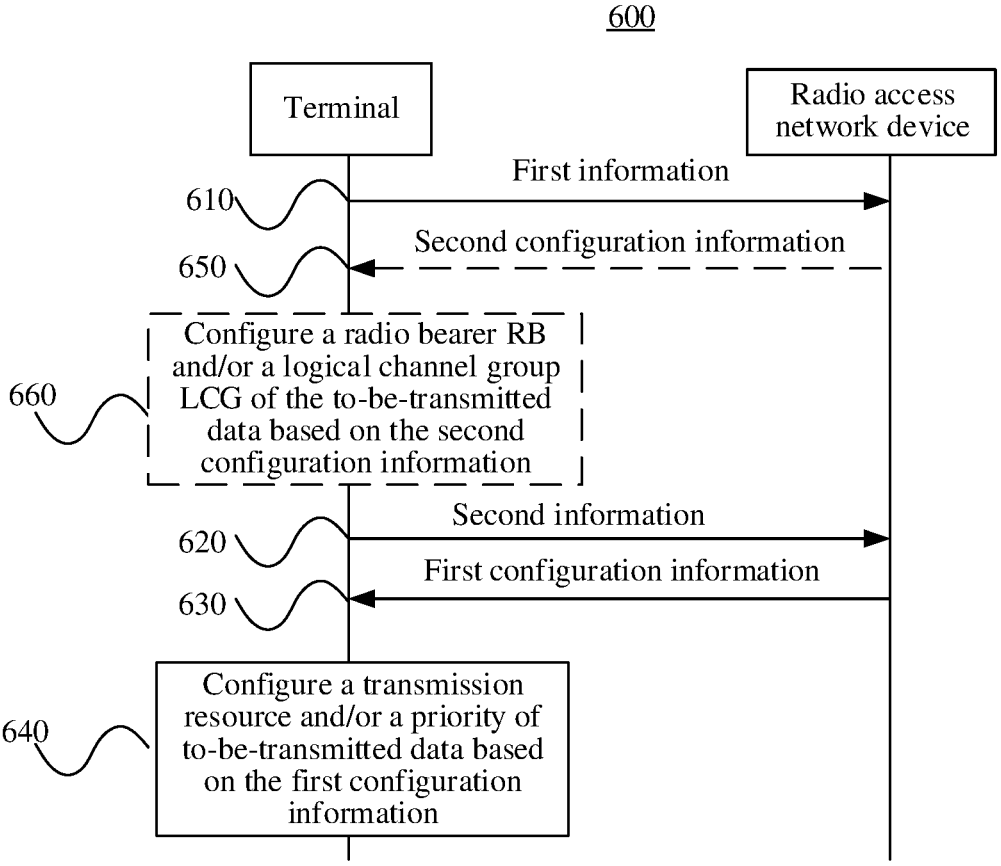
FIG. 6 is a schematic interaction diagram of a communication method according to this application.

FIG. 6 is a schematic interaction diagram of a communication method 600 according to an embodiment of this application. In FIG. 6, an example in which a radio access network device and a terminal are used as execution bodies of an interaction example is used to describe the communication method. However, the execution bodies of the interaction example are not limited in this application. For example, the radio access network device in FIG. 6 may alternatively be a chip, a chip system, or a processor that supports the radio access network device in implementing the method, and the terminal in FIG. 6 may alternatively be a chip, a chip system, or a processor that supports the terminal in implementing the method. The method 600 shown in FIG. 6 includes a part 610 to a part 640. According to the method, a loss of a small quantity of data packets in a network transmission process of a data packet having an integrity requirement can be effectively reduced, network uplink transmission efficiency is effectively improved, and user experience of a related service is enhanced. The following describes the method 600 provided in this embodiment of this application.

Part 610: The terminal sends first information to the radio access network device, and the radio access network device receives the first information from the terminal. The first information indicates an integrity transmission requirement of to-be-transmitted data of the terminal. It may be understood that a specific name of the integrity transmission requirement is not limited in this embodiment of this application. The integrity transmission requirement is merely a possible name. Any other requirement name that can reflect the foregoing functions should be understood as the integrity transmission requirement in the solutions of this application. It may be understood that when the foregoing integrity transmission requirement exists, data information included in a service may be considered as a whole and transmitted on a radio access network device side, to support integrity transmission of the data on the radio access network device, and improve user experience of an XR service.

Part 620: The terminal sends second information to the radio access network device, and the radio access network device receives the second information from the terminal. The second information indicates a data amount of the to-be-transmitted data. It may be understood that in this application, sequence numbers of the part 610 and the part 620 do not mean execution sequences. The execution sequences of the processes should be determined based on functions and internal logic of the processes, and should not be construed as any limitation on the implementation processes of this embodiment of this application. For example, the execution body may first perform the part 610 and then perform the part 620, or first perform the part 620 and then perform the part 610, or may simultaneously perform the part 610 and the part 620.

Part 630: The radio access network device outputs first configuration information based on the integrity transmission requirement and the data amount of the to-be-transmitted data, where the first configuration information is for configuring a transmission resource and/or a priority of the to-be-transmitted data. For example, the radio access network device reserves, for the terminal based on the first configuration information, an uplink transmission resource for transmitting the to-be-transmitted data. Alternatively, the radio access network device may increase, based on the first configuration information, a priority of a logical channel corresponding to the to-be-transmitted data, to ensure that the to-be-transmitted data is transmitted as soon as possible, and ensure that an end-to-end delay meets a requirement. It may be understood that in this application, "output" may be understood as sending of the execution body to another network element (such as the terminal) through a communication interface, or may be understood as outputting of the execution body to another module or unit, through a communication interface, in a network element in which the execution body is located.

Part 640: The terminal receives the first configuration information from the radio access network device; and configures the transmission resource and/or the priority of the to-be-transmitted data based on the first configuration information.

For example, the first configuration information may be downlink control information (DCI), and the DCI includes time domain and frequency domain transmission resource indication information of the to-be-transmitted data. The terminal transmits the to-be-transmitted data on a corresponding time domain resource and a corresponding frequency domain resource based on the transmission resource indication information in the DCI. The first configuration information may alternatively be included in an RRC message, for example, LogicalChannelConfig in the RRC message. The RRC message includes priority configuration information of the logical channel on which the to-be-transmitted data is located. The terminal device sets or adjusts, based on the priority configuration information in the RRC message, the priority of the logical channel on which the to-be-transmitted data is located.

According to the method in 610 to 640, the transmission resource and/or the priority of the to-be-transmitted data may be configured based on the first configuration information, so that the loss of the few data packets in the network transmission process of data packets having the integrity requirement can be effectively reduced, the network uplink transmission efficiency is improved, and user experience of the related service is enhanced.

In a possible implementation, the first information further indicates one or more of a delay budget of a data packet of the to-be-transmitted data, data packet arrival time of the to-be-transmitted data, or a remaining delay budget of the to-be-transmitted data. For example, the first information may further indicate the delay budget of the data packet of the to-be-transmitted data, the data packet arrival time of the to-be-transmitted data, or the remaining delay budget of the to-be-transmitted data. For another example, the first information may further indicate the delay budget of the data packet of the to-be-transmitted data and the data packet arrival time of the to-be-transmitted data. Alternatively, the first information may further indicate the delay budget of the data packet of the to-be-transmitted data and the remaining delay budget of the to-be-transmitted data. Alternatively, the first information may further indicate the data packet arrival time of the to-be-transmitted data and the remaining delay budget of the to-be-transmitted data. For another example, the first information may further indicate the delay budget of the data packet of the to-be-transmitted data, the data packet arrival time of the to-be-transmitted data, and the remaining delay budget of the to-be-transmitted data. Optionally, in a specific implementation of outputting the first configuration information in the part 630, the first configuration information is output based on the integrity transmission requirement and the data amount of the to-be-transmitted data and one or more of the delay budget of the data packet of the to-be-transmitted data, the data packet arrival time of the to-be-transmitted data, or the remaining delay budget of the to-be-transmitted data additionally indicated by the first information.

For example, the first configuration information is output based on the integrity transmission requirement and the data amount of the to-be-transmitted data and the remaining delay budget of the to-be-transmitted data. A time domain transmission resource that is of the to-be-transmitted data and that is indicated in the first configuration information is within a range of the remaining delay budget of the to-be-transmitted data. In addition, a size of the indicated transmission resource is greater than or equal to a size of a resource required for carrying the foregoing data amount, to ensure that all the to-be-transmitted data can be transmitted.

For another example, it is estimated, based on the integrity transmission requirement and the data amount of the to-be-transmitted data and the remaining delay budget of the to-be-transmitted data, whether transmission of the to-be-transmitted data can be completed within the remaining delay budget. If transmission can be completed, the first configuration information for setting or adjusting, based on the remaining delay budget, the priority of the logical channel on which the to-be-transmitted data is located is output. For example, a smaller remaining delay budget of the to-be-transmitted data indicates a higher priority of the logical channel on which the to-be-transmitted data is located. A larger remaining delay budget of the to-be-transmitted data indicates a lower priority of the logical channel on which the to-be-transmitted data is located. If transmission cannot be completed, the first configuration information for setting the priority of the logical channel on which the to-be-transmitted data is located to a lowest priority is output. The terminal device sets, based on the first configuration information, the priority of the logical channel on which the to-be-transmitted data is located.

In the foregoing manner, the transmission resource and/or the priority of the to-be-transmitted data may be configured based on the first configuration information, so that the loss of the few data packets in the network transmission process of data packets having the integrity requirement can be effectively reduced, the network uplink transmission efficiency is improved, and user experience of the related service is enhanced.

In a possible implementation of the part 610, that the terminal sends first information to the radio access network device, and the radio access network device receives the first information from the terminal includes: The terminal sends a radio resource control (RRC) message to the radio access network device, and the radio access network device receives the RRC message from the terminal. The RRC message includes the first information. Optionally, the first information includes a quality of service flow identifier QFI. In this manner, a process of interaction between the terminal and the radio access network device about the first information can be implemented.

Optionally, the method 600 may further include part 650 and part 660.

Part 650: The radio access network device outputs second configuration information based on the first information, where the second configuration information is for configuring a radio bearer RB and/or a logical channel group LCG of the to-be-transmitted data.

Part 660: The terminal receives the second configuration information from the radio access network device; and configures the radio bearer RB and/or the logical channel group LCG of the to-be-transmitted data based on the second configuration message.

Optionally, the second configuration information is for mapping a quality of service flow QoS flow of the to-be-transmitted data to a corresponding RB. For example, the second configuration information is carried in an RRC message. The second configuration information includes an SDAP-Config information element, and the SDAP-Config information element is for configuring a radio bearer. Table 1 shows partial content of the SDAP-Config information element. For example, a parameter "mappedQoS-Flows-ToAdd" in the SDAP-Config information element indicates a QoS flow mapped to the radio bearer. The QoS flow is identified by a QFI. In this manner, the radio access network device maps a QoS flow having an uplink integrity transmission requirement to a same radio bearer, or maps a QoS flow having an uplink integrity transmission requirement to a separate radio bearer, to facilitate implementation of integrity transmission.

TABLE 1

| SDAP-Config ::= | SEQUENCE { |
| pdu-Session | PDU-SessionID, |
| sdap-HeaderDL | ENUMERATED {present, absent}, |

TABLE 1-continued

| | |
|---|---|
| sdap-HeaderUL | ENUMERATED {present, absent}, |
| defaultDRB | BOOLEAN, |
| mappedQoS-FlowsToAdd | SEQUENCE (SIZE (1..maxNrofQFIs)) OF |
| QFI | OPTIONAL, -- Need N |
| mappedQoS-FlowsToRelease | SEQUENCE (SIZE (1..maxNrofQFIs)) OF |
| QFI | OPTIONAL, -- Need N |
| ... | |
| } | |

Optionally, the second configuration information is for classifying the logical channel of the to-be-transmitted data into a corresponding LCG. For example, the second configuration information is carried in an RRC message. The second configuration information includes a LogicalChannelConfig information element. Table 2 shows partial content of the LogicalChannelConfig information element. The LogicalChannelConfig information element is for configuring a logical channel, and a parameter logicalChannelGroup included in the LogicalChannelConfig information element indicates a logical channel group in which the logical channel is located. For example, a value of the parameter logicalChannelGroup may range from 0 to 7. When the value is "0", the first logical channel group is correspondingly used. If the value is "1", the second logical channel group is correspondingly used. The rest can be deduced by analogy. The radio access network device allocates a logical channel having an uplink integrity transmission requirement to a same logical channel group, or allocates a logical channel having an uplink integrity transmission requirement to a separate logical channel group, to facilitate implementation of integrity transmission.

It may be understood that sequence numbers of the part 630 and the part 650 do not mean execution sequences. For example, after configuring the logical channel group in the part 660, the terminal may perform the part 620 based on the configuration. The part 650 is performed after the part 610 and before the part 660. The part 660 is performed after the part 650 and before the part 620.

In another possible implementation of the part 610, that the terminal sends first information to the radio access network device, and the radio access network device receives the first information from the terminal includes: The terminal sends a media access control control element (MAC CE) to the radio access network device, and the radio access network device receives the MAC CE from the terminal. The MAC CE includes the first information. For example, the UE indicates the integrity transmission requirement by using one bit in the MAC CE. For another example, the UE indicates the integrity transmission requirement by using a plurality of bits (for example, eight bits) in the MAC CE. In this manner, the process of interaction between the terminal and the radio access network device about the first information can be implemented.

TABLE 2

| | |
|---|---|
| LogicalChannelConfig ::= | SEQUENCE { |
| ul-SpecificParameters | SEQUENCE { |
| priority | INTEGER (1..16), |
| prioritisedBitRate | ENUMERATED {kBps0, kBps8, kBps16, |
| kBps32, kBps64, kBps128, kBps256, kBps512, | |
| | kBps1024, kBps2048, kBps4096, |
| kBps8192, kBps16384, kBps32768, kBps65536, infinity}, | |
| bucketSizeDuration | ENUMERATED {ms5, ms10, ms20, |
| ms50, ms100, ms150, ms300, ms500, ms1000, | |
| | spare7, spare6, |
| spare5, spare4, spare3, spare2, spare1}, | |
| allowedServingCells | SEQUENCE (SIZE |
| (1..maxNrofServingCells-1)) OF ServCellIndex | |
| OPTIONAL, -- Cond PDCP-CADuplication | |
| allowedSCS-List | SEQUENCE (SIZE (1 .. maxSCSs)) OF |
| SubcarrierSpacing | OPTIONAL, -- Need R |
| maxPUSCH-Duration | ENUMERATED {ms0p02, ms0p04, |
| ms0p0625, ms0p125, ms0p25, ms0p5, spare2, spare1} | |
| OPTIONAL, -- Need R | |
| configuredGrantType1Allowed | ENUMERATED {true} |
| OPTIONAL, -- Need R | |
| logicalChannelGroup | INTEGER (0..maxLCG-ID) |
| OPTIONAL, -- Need R | |
| ... | |
| } | |

With reference to the part 650 and the part 660, the radio bearer RB and/or the logical channel group LCG of the to-be-transmitted data may be configured based on the second configuration information, so that the loss of the few data packets in the network transmission process of data packets having the integrity requirement can be effectively reduced, the network uplink transmission efficiency is improved, and user experience of the related service is enhanced.

In a possible implementation of the part 620, that the terminal sends second information to the radio access network device, and the radio access network device receives the second information from the terminal includes: The terminal sends a MAC CE to the radio access network device, and the radio access network device receives the MAC CE from the terminal. The MAC CE includes the second information. Optionally, the second information indicates a BSR. In this manner, a process of interaction between the terminal and the radio access network device about the second information can be implemented.

In another possible implementation of the part 630, the first configuration information is for configuring a priority of the logical channel corresponding to the to-be-transmitted data. For example, the first configuration information is included in an RRC message, for example, LogicalChannelConfig in the RRC message. The RRC message includes priority configuration information of the logical channel on which the to-be-transmitted data is located. The terminal device sets or adjusts, based on the priority configuration information in the RRC message, the priority of the logical channel on which the to-be-transmitted data is located. In this manner, the transmission resource and/or the priority of the to-be-transmitted data may be configured based on the first configuration information, so that the loss of the few data packets in the network transmission process of data packets having the integrity requirement can be effectively reduced, the network uplink transmission efficiency is improved, and user experience of the related service is enhanced.

Figure 7:
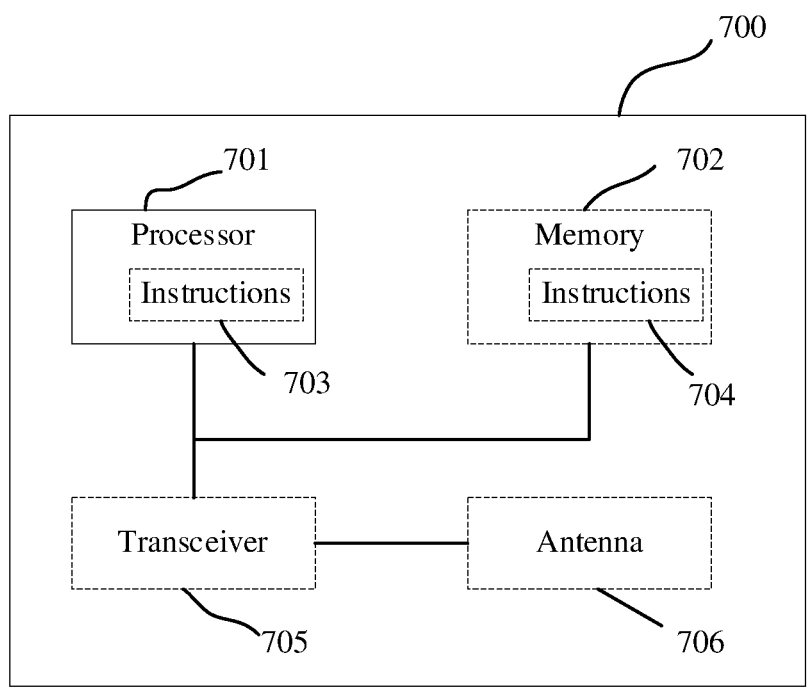
FIG. 7 is a schematic diagram of a structure of a communication apparatus according to an embodiment of this application.

FIG. 7 is a schematic diagram of a structure of an apparatus. The apparatus 700 may be a network device, may be a terminal device, may be a chip, a chip system, a processor, or the like that supports the network device in implementing the foregoing method, or may be a chip, a chip system, a processor, or the like that supports the terminal device in implementing the foregoing method. The apparatus may be configured to implement the method described in the foregoing method embodiment. For details, refer to the descriptions in the foregoing method embodiment.

The apparatus 700 may include one or more processors 701, and the processor 701 may also be referred to as a processing unit, and may implement a specific control function. The processor 701 may be a general-purpose processor, a dedicated processor, or the like. For example, the processor may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In an optional design, the processor 701 may alternatively store instructions and/or data 703, and the instructions and/or data 703 may be run by the processor, to enable the apparatus 700 to perform the method described in the foregoing method embodiment.

In another optional design, the processor 701 may include a transceiver unit configured to implement a receiving function and a sending function. For example, the transceiver unit may be a transceiver circuit, an interface, or an interface circuit. The transceiver circuit, the interface, or the interface circuit configured to implement the receiving function and the sending function may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, the apparatus 700 may include a circuit, and the circuit may implement the sending, receiving, or communication function in the foregoing method embodiment.

Optionally, the apparatus 700 may include one or more memories 702. The memory may store instructions 704, and the instructions may be run on the processor, so that the apparatus 700 performs the method described in the foregoing method embodiment. Optionally, the memory may further store data. Optionally, the processor may alternatively store instructions and/or data. The processor and the memory may be separately disposed, or may be integrated together. For example, the correspondence described in the foregoing method embodiment may be stored in the memory or stored in the processor.

Optionally, the apparatus 700 may further include a transceiver 705 and/or an antenna 706. The processor 701 may be referred to as a processing unit, and controls the apparatus 700. The transceiver 705 may be referred to as a transceiver unit, a transceiver, a transceiver circuit, a transceiver apparatus, an interface, an interface circuit, a transceiver module, or the like, and is configured to implement the receiving function and the sending function.

Optionally, the apparatus 700 in this embodiment of this application may be configured to perform the method described in FIG. 6 in this embodiment of this application.

The processor and the transceiver described in this application may be implemented in an integrated circuit (IC), an analog IC, a radio frequency integrated circuit RFIC, a mixed signal IC, an application-specific integrated circuit (ASIC), a printed circuit board (PCB), an electronic device, or the like. The processor and the transceiver may alternatively be manufactured by using various IC technologies, for example, a complementary metal oxide semiconductor (CMOS), an N-type metal oxide semiconductor (NMOS), a positive channel metal oxide semiconductor (PMOS), a bipolar junction transistor (BJT), a bipolar CMOS (BiCMOS), silicon germanium (SiGe), and gallium arsenide (GaAs).

The apparatus described in the foregoing embodiment may be a network device or a terminal device. However, a range of the apparatus described in this application is not limited thereto, and a structure of the apparatus may not be limited to FIG. 7. The apparatus may be an independent device, or may be a part of a larger device. For example, the apparatus may be:

(1) an independent integrated circuit IC, a chip, or a chip system or subsystem;

(2) a set of one or more ICs, where optionally, the IC set may also include a storage component configured to store data and/or instructions;

(3) an ASIC, for example, a modem (MSM);

(4) a module that may be embedded in another device;

(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like; or (6) others.

Figure 8:
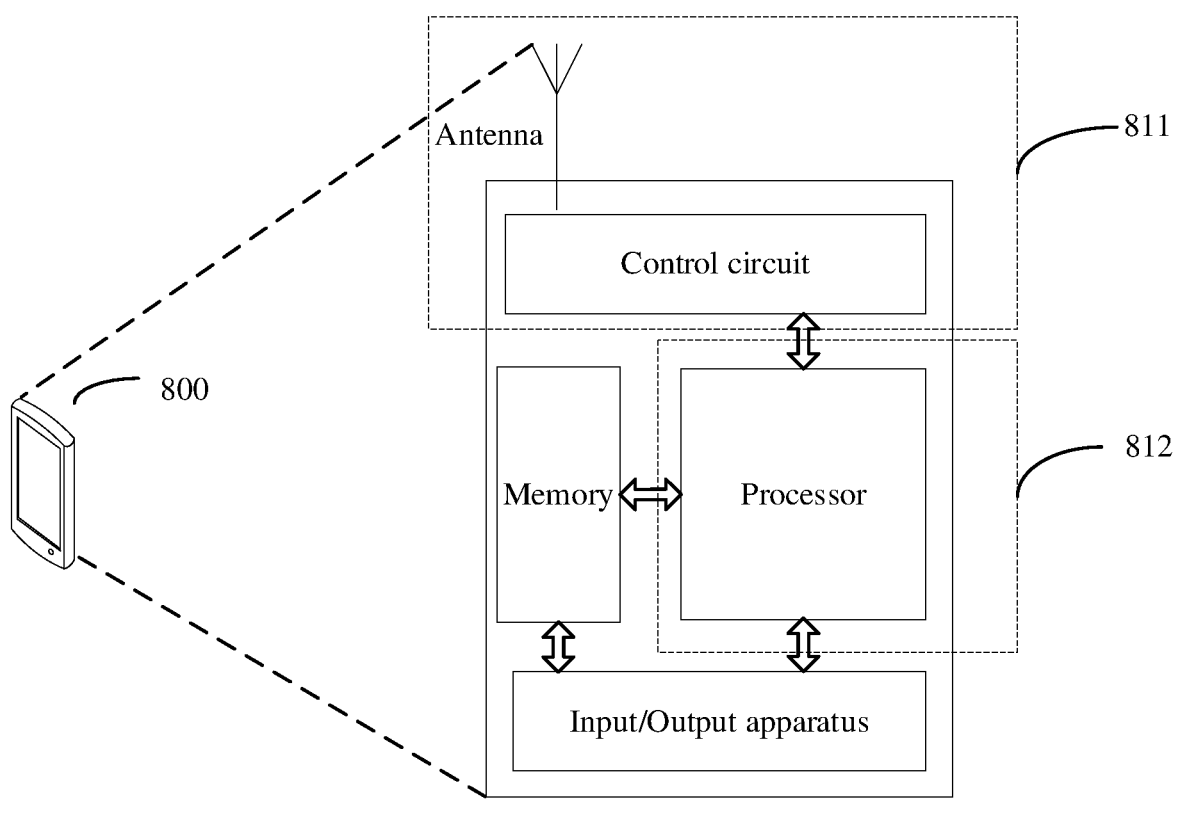
FIG. 8 is a schematic diagram of a structure of a terminal according to an embodiment of this application.

FIG. 8 is a schematic diagram of a structure of a terminal. The terminal is applicable to the scenario shown in FIG. 1, FIG. 2, FIG. 3, FIG. 4, or FIG. 5. For ease of description, FIG. 8 shows only main components of the terminal. As shown in FIG. 8, the terminal 800 includes a processor, a memory, a control circuit, an antenna, and an input/output apparatus. The processor is mainly configured to: process a communication protocol and communication data, control the entire terminal, execute a software program, and process data of the software program. The memory is mainly configured to store a software program and data. The radio frequency circuit is mainly configured to: perform conversion between a baseband signal and a radio frequency signal, and process the radio frequency signal. The antenna is mainly configured to receive and send the radio frequency signal in a form of an electromagnetic wave. The input/output apparatus is, for example, a touchscreen, a display, or a keyboard, and is mainly configured to: receive data entered by a user and output data to the user.

After the terminal is powered on, the processor may read a software program in a storage unit, interpret and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in a form of an electromagnetic wave through the antenna. When data is sent to the terminal, the radio frequency circuit receives the radio frequency signal through the antenna, further converts the radio frequency signal into a baseband signal, and outputs the baseband signal to the processor. The processor converts the baseband signal into data, and processes the data.

For ease of description, FIG. 8 shows only one memory and one processor. In an actual terminal, there may be a plurality of processors and memories. The memory may also be referred to as a storage medium, a storage device, or the like. This is not limited in this embodiment of the present application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 8 integrates functions of the baseband processor and the central processing unit. A person skilled in the art may understand that the baseband processor and the central processing unit may alternatively be independent processors, and are interconnected by using a technology such as a bus. A person skilled in the art may understand that the terminal may include a plurality of baseband processors to adapt to different network standards, the terminal may include a plurality of central processing units to enhance a processing capability, and components of the terminal may be connected through various buses. The baseband processor may also be expressed as a baseband processing circuit or a baseband processing chip. The central processing unit may also be expressed as a central processing circuit or a central processing chip. A function of processing the communication protocol and the communication data may be embedded in the processor, or may be stored in a storage unit in a form of the software program. The processor executes the software program to implement a baseband processing function.

In an example, the antenna and the control circuit that have the receiving function and the sending function may be considered as a transceiver unit 811 of the terminal 800, and the processor having a processing function may be considered as a processing unit 812 of the terminal 800. As shown in FIG. 8, the terminal 800 includes the transceiver unit 811 and the processing unit 812. The transceiver unit may also be referred to as a transceiver, a transceiver machine, a transceiver apparatus, or the like. Optionally, a component configured to implement the receiving function in the transceiver unit 811 may be considered as a receiving unit, and a component configured to implement the sending function in the transceiver unit 811 may be considered as a sending unit. In other words, the transceiver unit 811 includes the receiving unit and the sending unit. For example, the receiving unit may also be referred to as a receiver, a receiver machine, a receiver circuit, or the like, and the sending unit may be referred to as a transmitter, a transmitter machine, a transmitter circuit, or the like. Optionally, the receiving unit and the sending unit may be one integrated unit, or may be a plurality of independent units. The receiving unit and the sending unit may be at one geographical location, or may be distributed at a plurality of geographical locations.

Figure 9:
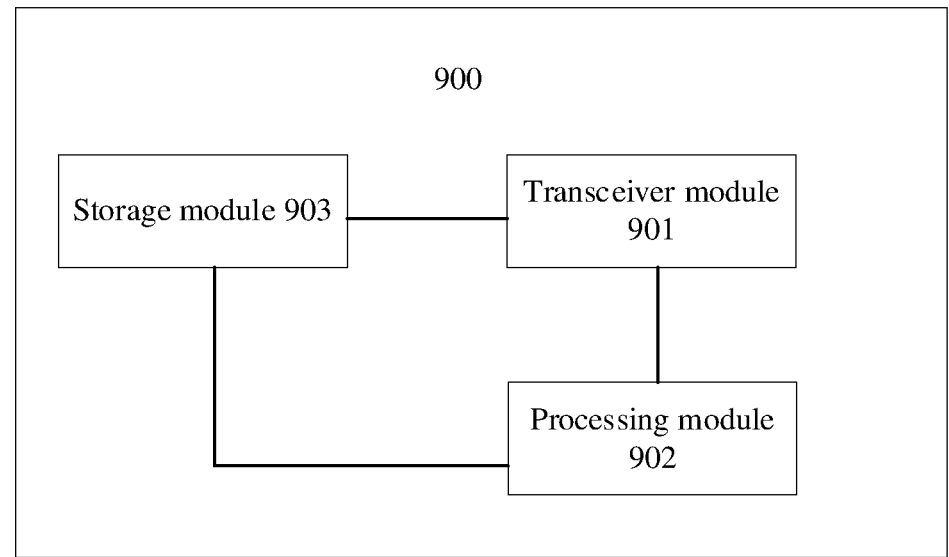
FIG. 9 is a schematic diagram of another communication apparatus according to an embodiment of this application.

As shown in FIG. 9, another embodiment of this application provides an apparatus 900. The apparatus may be a terminal, or may be a component (for example, an integrated circuit or a chip) of the terminal. Alternatively, the apparatus may be a network device, or may be a component (for example, an integrated circuit or a chip) of the network device. Alternatively, the apparatus may be another communication module, configured to implement the method in the method embodiment of this application. The apparatus 900 may include a processing module 902 (also referred to as a processing unit). Optionally, the apparatus may further include a transceiver module 901 (also referred to as a transceiver unit, an interface module, or an interface unit) and a storage module 903 (also referred to as a storage unit).

In a possible design, one or more modules in FIG. 9 may be implemented by one or more processors, may be implemented by one or more processors and one or more memories, may be implemented by one or more processors and one or more transceivers, or may be implemented by one or more processors, one or more memories, and one or more transceivers. This is not limited in this embodiment of this application. The processor, the memory, and the transceiver may be separately disposed, or may be integrated.

The apparatus has a function of implementing the terminal described in embodiments of this application. For example, the apparatus includes a corresponding module, unit, or means used for the terminal to perform the steps that are related to the terminal and that are described in embodiments of this application. The function, the unit, or the means may be implemented by software or hardware, may be implemented by hardware executing corresponding software, or may be implemented by a combination of software and hardware. For details, further refer to the corresponding descriptions in the foregoing corresponding method embodiment. Alternatively, the apparatus has a function of implementing the network device described in embodiments of this application. For example, the apparatus includes a corresponding module, unit, or means used for the network device to perform the steps that are related to the network device and that are described in embodiments of this application. The function, the unit, or the means may be implemented by software or hardware, may be implemented by hardware executing corresponding software, or may be implemented by a combination of software and hardware. For details, further refer to the corresponding descriptions in the foregoing corresponding method embodiment.

Optionally, the modules in the apparatus 900 in this embodiment of this application may be configured to perform the method described in FIG. 6 in embodiments of this application.

In a possible design, the apparatus 900 may include: the processing module 902 and the transceiver module 901. The transceiver module 901 is configured to receive first information from a terminal, where the first information indicates an integrity transmission requirement of to-be-transmitted data of the terminal. The transceiver module 901 is further configured to receive second information from the terminal, where the second information indicates a data amount of the to-be-transmitted data. The processing module 902 is configured to output first configuration information based on the integrity transmission requirement and the data amount of the to-be-transmitted data, where the first configuration information is for configuring a transmission resource and/or a priority of the to-be-transmitted data. According to the apparatus, the transmission resource and/or the priority of the to-be-transmitted data may be configured based on the first configuration information, so that a loss of a small quantity of data packets in a network transmission process of a data packet having an integrity requirement can be effectively reduced, network uplink transmission efficiency is improved, and user experience of a related service is enhanced.

In some possible implementations of the apparatus 900, the first information further indicates one or more of a delay budget of a data packet of the to-be-transmitted data, data packet arrival time of the to-be-transmitted data, or a remaining delay budget of the to-be-transmitted data. For example, the first information may further indicate the delay budget of the data packet of the to-be-transmitted data, the data packet arrival time of the to-be-transmitted data, or the remaining delay budget of the to-be-transmitted data. For another example, the first information may further indicate the delay budget of the data packet of the to-be-transmitted data and the data packet arrival time of the to-be-transmitted data. Alternatively, the first information may further indicate the delay budget of the data packet of the to-be-transmitted data and the remaining delay budget of the to-be-transmitted data. Alternatively, the first information may further indicate the data packet arrival time of the to-be-transmitted data and the remaining delay budget of the to-be-transmitted data. For another example, the first information may further indicate the delay budget of the data packet of the to-be-transmitted data, the data packet arrival time of the to-be-transmitted data, and the remaining delay budget of the to-be-transmitted data.

In some possible implementations of the apparatus 900, that the processing module 902 is configured to output first configuration information based on the integrity transmission requirement and the data amount of the to-be-transmitted data includes: The processing module 902 is configured to output the first configuration information based on the integrity transmission requirement and the data amount of the to-be-transmitted data and one or more of the delay budget of the data packet of the to-be-transmitted data, the data packet arrival time of the to-be-transmitted data, or the remaining delay budget of the to-be-transmitted data.

In some possible implementations of the apparatus 900, that the transceiver module 901 is configured to receive first information from a terminal includes: The transceiver module 901 is configured to receive a radio resource control RRC message from the terminal, where the RRC message includes the first information.

In some possible implementations of the apparatus 900, the first information further includes a quality of service flow identifier QFI.

In some possible implementations of the apparatus 900, the processing module 902 is further configured to output second configuration information based on the first information, where the second configuration information is for configuring a radio bearer RB and/or a logical channel group LCG of the to-be-transmitted data. According to the apparatus, the transmission resource and/or the priority of the to-be-transmitted data may be configured based on the second configuration information, so that the loss of the few data packets in the network transmission process of data packets having the integrity requirement can be effectively reduced, the network uplink transmission efficiency is improved, and user experience of the related service is enhanced.

In some possible implementations of the apparatus 900, the second configuration information is for mapping a quality of service flow QoS flow of the to-be-transmitted data to a corresponding RB.

In some possible implementations of the apparatus 900, the second configuration information is for classifying a logical channel of the to-be-transmitted data into a corresponding LCG.

In some possible implementations of the apparatus 900, that the transceiver module 901 is configured to receive first information from a terminal includes: The transceiver module 901 is configured to receive a media access control control element (MAC CE) from the terminal, where the MAC CE includes the first information.

In some possible implementations of the apparatus 900, that the transceiver module 901 is further configured to receive second information from the terminal includes: The transceiver module 901 is further configured to receive a MAC CE from the terminal, where the MAC CE includes the second information.

In some possible implementations of the apparatus 900, the first configuration information is for configuring a priority of the logical channel corresponding to the to-be-transmitted data.

In another possible design, the apparatus 900 may include: the processing module 902 and the transceiver module 901. The transceiver module 901 is configured to send first information to a radio access network device, where the first information indicates an integrity transmission requirement of to-be-transmitted data of a terminal. The transceiver module 901 is further configured to send second information to the radio access network device, where the second information indicates a data amount of the to-be-transmitted data. The transceiver module 901 is further configured to receive first configuration information from the radio access network device. The processing module 902 configures a transmission resource and/or a priority of the to-be-transmitted data based on the first configuration information. According to the apparatus, the transmission resource and/or the priority of the to-be-transmitted data may be configured based on the first configuration information, so that a loss of a small quantity of data packets in a network transmission process of a data packet having an integrity requirement can be effectively reduced, network uplink transmission efficiency is improved, and user experience of a related service is enhanced.

In some possible implementations of the apparatus 900, the first information further indicates one or more of a delay budget of a data packet of the to-be-transmitted data, data packet arrival time of the to-be-transmitted data, or a remaining delay budget of the to-be-transmitted data. For example, the first information may further indicate the delay budget of the data packet of the to-be-transmitted data, the data packet arrival time of the to-be-transmitted data, or the remaining delay budget of the to-be-transmitted data. For another example, the first information may further indicate the delay budget of the data packet of the to-be-transmitted data and the data packet arrival time of the to-be-transmitted data. Alternatively, the first information may further indicate the delay budget of the data packet of the to-be-transmitted data and the remaining delay budget of the to-be-transmitted data. Alternatively, the first information may further indicate the data packet arrival time of the to-be-transmitted data and the remaining delay budget of the to-be-transmitted data. For another example, the first information may further indicate the delay budget of the data packet of the to-be-transmitted data, the data packet arrival time of the to-be-transmitted data, and the remaining delay budget of the to-be-transmitted data.

In some possible implementations of the apparatus 900, that the transceiver module 901 is configured to send first information to a radio access network device includes: The transceiver module 901 is configured to send a radio resource control RRC message to the radio access network device, where the RRC message includes the first information.

In some possible implementations of the apparatus 900, the first information further includes a quality of service flow identifier QFI.

In some possible implementations of the apparatus 900, the transceiver module 901 is further configured to receive a second configuration message from the radio access network device. The processing module 902 configures a radio bearer RB and/or a logical channel group LCG of the to-be-transmitted data based on the second configuration message.

In some possible implementations of the apparatus 900, that the processing module 902 is further configured to configure a radio bearer RB of the to-be-transmitted data based on the second configuration message includes: The processing module 902 is further configured to map a quality of service flow QoS flow of the to-be-transmitted data to a corresponding RB based on the second configuration message.

In some possible implementations of the apparatus 900, that the processing module 902 is further configured to configure an LCG of the to-be-transmitted data based on the second configuration message includes: The processing module 902 is further configured to classify, based on the second configuration message, a logical channel of the to-be-transmitted data into a corresponding service LCG.

In some possible implementations of the apparatus 900, that the transceiver module 901 is configured to send first information to a radio access network device includes: The transceiver module 901 is configured to send a MAC CE to the radio access network device, where the MAC CE includes the first information.

In some possible implementations of the apparatus 900, that the transceiver module 901 is further configured to send second information to the radio access network device includes: The transceiver module 901 is further configured to send a MAC CE to the radio access network device, where the MAC CE includes the second information.

In some possible implementations of the apparatus 900, that the processing module 902 is configured to configure a priority of the to-be-transmitted data based on the first configuration information includes: The processing module 902 is configured to configure, based on the first configuration information, a priority of the logical channel corresponding to the to-be-transmitted data.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

A person skilled in the art may further understand that various illustrative logical blocks and steps that are listed in embodiments of this application may be implemented by electronic hardware, computer software, or a combination thereof. Whether the functions are implemented by hardware or software depends on particular applications and a design requirement of the entire system. A person skilled in the art may use various methods to implement the functions for corresponding applications, but it should not be considered that the implementation goes beyond the scope of embodiments of this application.

It may be understood that, the processor in embodiments of this application may be an integrated circuit chip, and has a signal processing capability. In an implementation process, the steps in the foregoing method embodiment may be completed by an integrated logic circuit in a form of hardware or instructions in a form of software in the processor. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

The solutions described in this application may be implemented in various manners. For example, the technologies may be implemented by hardware, software, or a combination thereof. For hardware implementation, a processing unit configured to perform these technologies at a communication apparatus (for example, a base station, a terminal, a network entity, or a chip) may be implemented in one or more general-purpose processors, a DSP, a digital signal processor, an ASIC, a programmable logic device, an FPGA or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and the method described in this specification is intended to include, but not limited to, these memories and any memory of another proper type.

This application further provides a computer-readable medium storing a computer program. When the computer program is executed by a computer, functions of any method embodiment are implemented.

This application further provides a computer program product. When the computer program product is executed by a computer, functions of any method embodiment are implemented.

All or some of the foregoing embodiments may be implemented through software, hardware, firmware, or any combination thereof. When software is used to implement embodiments, all or some of embodiments may be implemented in a form of a computer program product. The computer program product includes one or more computer instructions. When the computer instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

It may be understood that "an embodiment" mentioned in this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments in any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It should be understood that, in this application, "when" and "if" mean that an apparatus performs corresponding processing in an objective situation, and are not intended to limit time. The terms do not mean that the apparatus is required to have a determining action during implementation, and do not mean any other limitation.

"Simultaneously" in this application may be understood as being at a same time point, may be understood as being within a time period, or may be understood as being within a same periodicity.

A person skilled in the art may understand that various numbers such as first and second in this application are merely used for differentiation for ease of description, and are not used to limit the scope of embodiments of this application. A specific value of a number (which may also be referred to as an index), a specific value of a quantity, and a position in this application are merely used as examples, but are not unique representation forms, and are not used to limit the scope of embodiments of this application. Various numbers such as first and second in this application are merely used for differentiation for ease of description, and are not used to limit the scope of embodiments of this application.

In this application, an element represented in a singular form is intended to represent "one or more", but does not represent "one and only one", unless otherwise specified. In this application, unless otherwise specified, "at least one" is intended to represent "one or more", and "a plurality of" is intended to represent "two or more".

In addition, the terms "system" and "network" in this specification may be used interchangeably in this specification. The term "and/or" in this specification describes only an association relationship between associated objects and represents that three relationships may exist. For example, A and/or B may represent the following three cases: Only A exists, both A and B exist, and only B exists. A may be singular or plural, and B may be singular or plural. The character "/" usually indicates an "or" relationship between associated objects.

The term "at least one of" in this specification indicates all combinations or any combination of listed items. For example, "at least one of A, B, and C" may indicate the following six cases: Only A exists, only B exists, only C exists, A and B coexist, B and C coexist, and A, B, and C coexist. A may be singular or plural, B may be singular or plural, and C may be singular or plural.

It should be understood that in embodiments of this application, "B corresponding to A" represents that B is associated with A, and B may be determined based on A. However, it should be further understood that determining B based on A does not mean determining B only based on A, and B may further be determined based on A and/or other information.

The correspondences shown in the tables in this application may be configured, or may be predefined. Values of the information in the tables are merely examples, and other values may be configured. This is not limited in this application. When a correspondence between the information and the parameters is configured, not all the correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

A person of ordinary skill in the art may understand that, for the purpose of convenient and brief description, for a detailed working process of the foregoing system, apparatuses, and units, refer to a corresponding process in the foregoing method embodiment. Details are not described herein again.

It may be understood that the system, apparatuses, and methods described in this application may alternatively be implemented in another manner. For example, the described apparatus embodiments are merely examples. For example, division into the units is merely logical function division, and may be other division during actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing descriptions are implementations of this application, but are not intended to limit the protection scope of this application.

The foregoing descriptions are merely specific implementations of this application, but the protection scope of this application is not limited thereto. Any variation or replacement readily figured out by a person skilled in the art within the technical scope disclosed in this application shall fall within the protection scope of this application.

What is claimed is:

1. A communication method performed by a communication apparatus, comprising:
    sending first information to a radio access network device, wherein the first information indicates an integrity transmission requirement of to-be-transmitted data of a terminal device to ensure that a plurality of data units of the to-be-transmitted data are transmitted as a whole;
    sending second information to the radio access network device, wherein the second information indicates a data amount of the to-be-transmitted data;
    receiving first configuration information from the radio access network device, wherein the first configuration information is based on the first information and the second information; and
    configuring a priority of the to-be-transmitted data, or both a transmission resource and the priority of the to-be-transmitted data, based on the first configuration information, wherein the first information further indicates a remaining delay budget of the to-be-transmitted data, and the priority of the to-be-transmitted data is adjustable regarding the remaining delay budget of the to-be-transmitted data.

2. The method according to claim 1, wherein the first configuration information indicates a first logical channel group including one or more logical channels that have the integrity transmission requirement.

3. The method according to claim 1, wherein the first information in carried in a media access control control element (MAC CE).

4. The method according to claim 1, wherein the plurality of data units comprise a plurality of video frames, a plurality of video frame segments, or a plurality of video frame slices that are considered as a whole for transmission.

5. A communication apparatus comprising: a processor configured to:
    send first information to a radio access network device, wherein the first information indicates an integrity transmission requirement of to-be-transmitted data of a terminal device to ensure that a plurality of data units of the to-be-transmitted data are transmitted as a whole;
    send second information to the radio access network device, wherein the second information indicates a data amount of the to-be-transmitted data;
    receive first configuration information from the radio access network device, wherein the first configuration information is based on the first information and the second information; and
    configure a priority of the to-be-transmitted data, or both a transmission resource and the priority of the to-be-transmitted data, based on the first configuration information, wherein the first information further indicates a remaining delay budget of the to-be-transmitted data, and the priority of the to-be-transmitted data is adjustable regarding the remaining delay budget of the to-be-transmitted data.

6. The communication apparatus according to claim 5, wherein the first configuration information indicates a first logical channel group including one or more logical channels that have the integrity transmission requirement.

7. The communication apparatus according to claim 5, wherein the first information in carried in a media access control control element (MAC CE).

8. The communication apparatus according to claim 5, wherein the plurality of data units comprise a plurality of video frames, a plurality of video frame segments, or a plurality of video frame slices that are considered as a whole for transmission.

9. A communication apparatus comprising: a processor configured to: receive first information from a terminal device, wherein the first information indicates an integrity transmission requirement of to-be-transmitted data of the terminal device to ensure that a plurality of data units of the to-be-transmitted data are transmitted as a whole; receive second information from the terminal device, wherein the second information indicates a data amount of the to-be-transmitted data; determine first configuration information based on the first information and the second information, such that the terminal device sends the plurality of data units of the to-be-transmitted data as a whole; and send the first confirmation information to the terminal device; wherein the determine the first configuration information comprises: determine a priority of the to-be-transmitted data based on a remaining delay budget of the to-be-transmitted data, wherein the priority of the to-be-transmitted data is adjustable dependent on an amount of the remaining delay budget.

10. The communication apparatus according to claim 9, wherein the first information further indicates a remaining delay budget of the to-be-transmitted data.

11. The communication apparatus according to claim 9, wherein the processor is further configured to: allocate logical channels having the integrity transmission requirement to a same logical channel group, wherein the first configuration information indicates the same logical channel group including the logical channels that have the integrity transmission requirement.

12. The communication apparatus according to claim 9, wherein the first information in carried in a media access control control element (MAC CE).

13. The communication apparatus according to claim 9, wherein the plurality of data units comprise a plurality of video frames, a plurality of video frame segments, or a plurality of video frame slices that are considered as a whole for transmission.

* * * * *